US010260914B1

United States Patent
Ippolito et al.

(10) Patent No.: US 10,260,914 B1
(45) Date of Patent: Apr. 16, 2019

(54) FIBER OPTIC DISPLACEMENT SENSOR

(71) Applicant: Angstrom Science, Inc., Santa Barbara, CA (US)

(72) Inventors: Stephen Bradley Ippolito, Saint Petersburg, FL (US); Andrew Norman Erickson, Santa Barbara, CA (US); Kyle Alfred Hofstatter, Santa Barbara, CA (US)

(73) Assignee: Angstrom Science, Inc., Santa Barbara, CA (US)

( * ) Notice: Subject to any disclaimer, the term of this patent is extended or adjusted under 35 U.S.C. 154(b) by 0 days.

(21) Appl. No.: 15/882,342

(22) Filed: Jan. 29, 2018

Related U.S. Application Data

(60) Provisional application No. 62/590,812, filed on Nov. 27, 2017.

(51) Int. Cl.
*G01D 5/353* (2006.01)
*G02B 6/028* (2006.01)
*G02B 6/255* (2006.01)

(52) U.S. Cl.
CPC ........... *G01D 5/353* (2013.01); *G02B 6/0288* (2013.01); *G02B 6/255* (2013.01)

(58) Field of Classification Search
CPC ...... G01D 5/353; G02B 6/022; G02B 6/0288; G02B 6/255; G01B 11/18
See application file for complete search history.

(56) References Cited

U.S. PATENT DOCUMENTS

| | | | | | |
|---|---|---|---|---|---|
| 5,420,688 | A | * | 5/1995 | Farah | G01D 5/268 250/227.27 |
| 6,360,042 | B1 | * | 3/2002 | Long | G02B 6/022 385/12 |
| 7,274,835 | B2 | * | 9/2007 | Panepucci | G01D 5/266 385/12 |
| 7,486,852 | B2 | * | 2/2009 | Rothenberg | G02B 6/022 385/27 |
| 7,792,395 | B2 | * | 9/2010 | Lagakos | G01D 5/268 385/12 |
| 9,797,922 | B2 | * | 10/2017 | Erickson | G01Q 20/02 |
| 2005/0220401 | A1 | * | 10/2005 | Jiang | G02B 6/262 385/28 |
| 2013/0088710 | A1 | * | 4/2013 | Brastaviceanu | G01B 11/14 356/72 |
| 2014/0318273 | A1 | * | 10/2014 | Dong | G01K 11/3206 73/862.624 |

OTHER PUBLICATIONS

Patrick J. Murphy and Thomas P. Coursolle, "Fiber optic displacement sensor employing a graded index lens," Applied Optics, vol. 29, No. 4, pp. 544-547 (1990).*

* cited by examiner

*Primary Examiner* — Daniel Petkovsek
(74) *Attorney, Agent, or Firm* — Felix L. Fischer

(57) ABSTRACT

A displacement sensor has a graded index multi-mode fiber with a length that is an odd multiple of a quarter pitch length of the graded index multi-mode fiber and a single-mode optical fiber fusion spliced to the first end of said graded index multi-mode fiber. A reflective mirror coating is applied to a planar facet on the second end of said graded index multi-mode fiber. A plurality of mechanical attachments are spaced along the graded index multi-mode fiber and single-mode optical fiber that mechanically deform said graded index multi-mode fiber, when any one of said plurality of mechanical attachments is displaced relative to any other one of said plurality of mechanical attachments.

4 Claims, 11 Drawing Sheets

FIBER OPTIC DISPLACEMENT SENSOR

REFERENCE TO RELATED APPLICATIONS

This application claims priority of U.S. provisional application Ser. No. 62/590,812 filed on Nov. 27, 2017 entitled FIBER OPTIC DISPLACEMENT SENSOR having a common assignee with the present application.

BACKGROUND INFORMATION

Embodiments of the disclosure relate generally to the field of measuring angular, bending, and linear displacement, by sensors composed of fiber optics that modulate the intensity of light, and more particularly to fiber optic position sensors with a diameter and range of less than a millimeter.

Detection of linear displacement with nanometer scale resolution can be accomplished by a variety of standard position sensors, including piezoelectric, resistive, inductive, capacitive, and optical types, and recent designs have reached sizes, as small as a few millimeters as disclosed in A. J. Fleming, "A review of nanometer resolution position sensors: Operation and performance," Sensors and Actuators A 190, 106 (2013); U.S. Pat. No. 8,570,529 B2, "Device for position detection"; U.S. Pat. No. 8,773,666 B2, "Device and method for acquiring position with a confocal Fabry-Perot interferometer"; U.S. Pat. No. 7,038,443 B2, "Linear Variable Differential Transformers For High Precision Position Measurements". However, there are currently no inexpensive, simple, and robust position sensors, with sizes well below a millimeter to use in small instrument designs.

Interferometry based optical displacement sensors modulate the phase of light and achieve high resolution and small sensor size, but are complex and expensive to produce, U.S. Pat. No. 8,773,666; U.S. Pat. No. 6,069,686, "Self-Calibrating Optical Fiber Pressure, Strain And Temperature Sensors"; U.S. Pat. No. 5,477,323, "Fiber Optic Strain Sensor And Read-Out System". Intensity based optical position sensors modulate the amplitude of light, and a variety of simple and inexpensive designs have been developed. For example, the divergence of light from the end facet of a single-mode fiber can modulate the optical intensity to sense position, U.S. Pat. No. 4,670,649, "Optical Transducer And Measuring Device"; U.S. Pat. No. 5,473,156, "Optical Displacement Sensor Using Dual Reference Reflectors". Similarly, the assignee of the present application has developed an external sensor that modulates the optical intensity with angular displacement, for scanning probe microscopy; U.S. Pat. No. 9,366,695, "Scanning Probe Microscope Head Design". Optical intensity can be internally modulated by displacement, using the emission of light from the core of a fiber with surface treatment, however, the size, cost, and resolution of such designs have not been practically demonstrated, U.S. Pat. No. 5,633,494, "Fiber Optic Bending And Position Sensor With Selected Curved Light Emission Surfaces". The simplest and best way to measure displacements internally in a displaced fiber is by mode cross coupling to change the optical intensity, U.S. Pat. No. 4,342,907, "Optical Sensing Apparatus And Method".

SUMMARY

Embodiments described herein disclose a displacement sensor having a graded index multi-mode fiber with a length that is an odd multiple of a quarter pitch length of the graded index multi-mode fiber and a single-mode optical fiber fusion spliced to the first end of said graded index multi-mode fiber. A reflective mirror coating is applied to a planar facet on the second end of said graded index multi-mode fiber. A plurality of mechanical attachments are spaced along the graded index multi-mode fiber and single-mode optical fiber that mechanically deform said graded index multi-mode fiber, when any one of said plurality of mechanical attachments is displaced relative to any other one of said plurality of mechanical attachments.

The features, functions, and advantages that have been discussed can be achieved independently in various embodiments of the present invention or may be combined in yet other embodiments further details of which can be seen with reference to the following description and drawings.

DETAILED DESCRIPTION

Embodiments described herein disclose a displacement sensor which incorporates two sections of optical fiber and a mirror coating, which modulates the optical intensity internally. A separate optical instrument connected to the displacement sensor is required, in order to send light into the sensor and measure light returned from the sensor. The first section of optical fiber in the sensor is a single-mode optical fiber connected at one end to the optical instrument. The second section of optical fiber in the sensor is a graded index multi-mode fiber, with a length that is an odd multiple of its quarter pitch length. The first end of the multi-mode fiber section is fusion spliced to the second end of the single-mode fiber section. The second end of the multi-mode fiber section has a planar facet with a reflective mirror coating applied. The second end of the single mode fiber is attached to an optical instrument having elements providing source, detection and beam splitting. The sensor is mechanically attached at multiple points, so that angular, bending, and linear displacement of the multi-mode fiber section modulates the optical intensity returning back into the single-mode fiber core. Operating near the half intensity point, as the displacement midpoint center, maximizes the sensitivity, which is the change in intensity with displacement. The exemplary embodiments disclosed have been reduced to practice for a variety of measurement ranges of angular, bending, and linear displacement. The particular focus of the present embodiments is on position sensing, with ranges between a micrometer and a millimeter and a resolution, between a picometer and a nanometer. The standard diameter of 125 micrometers for cladding of single and multi-mode fibers leads to simple manufacturing of these sensors, using associated stripping, cleaving, and splicing tooling. The internal nature of this sensor, in that all light is contained within the sensor during operation, allows it to be used in harsh environments, such as underwater, without altering its performance.

Figure 1:
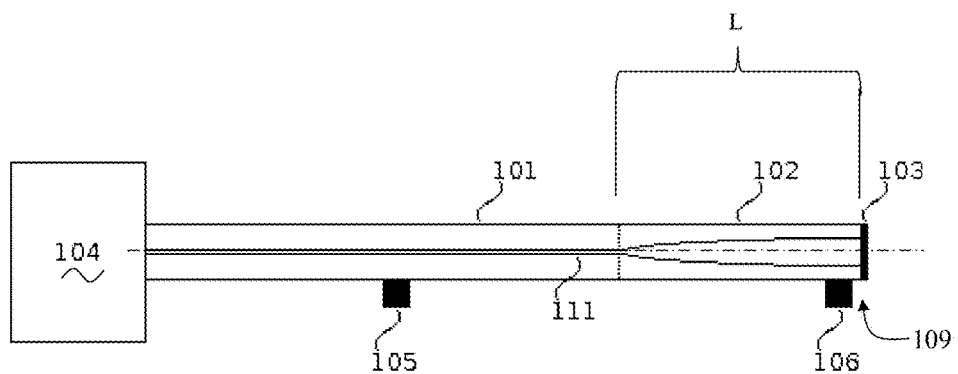
FIG. 1 is a side view representation of a first embodiment of the Fiber Optic Displacement Sensor.
Figure 2:
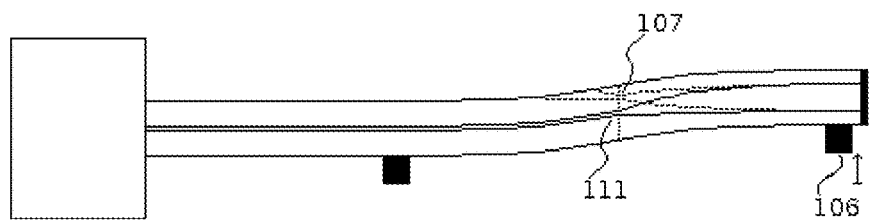
FIG. 2 is a side view representation of the Fiber Optic Displacement Sensor from FIG. 1, under linear displacement radially.

For a first embodiment of the fiber optic displacement sensor described herein, a displacement sensor composed of a single-mode fiber 101, a graded index multi-mode fiber 102, and a reflective coating 103, is employed, as shown in FIG. 1. The single-mode fiber 101 can be any convenient length to couple light between the displacement sensor and a separate optical instrument 104 having integrated source, detection and beam splitting elements, which sends light into the sensor and measures the light intensity returned from the sensor. In addition to acting as a waveguide, the fundamental mode of the single-mode fiber 101 acts as a displacement detector by modulating the intensity of light via the spatial filtering of light coupled back into the single-mode fiber 101. To accomplish this, a radial offset of the returning focus of light relative to the core 111 of the single-mode fiber 101 is introduced by elastic deformation of the graded index multi-mode fiber 102, which acts as a lens and is fusion spliced to the single-mode fiber 101. A reflective mirror coating 103 applied to the planar facet of the graded index multi-mode fiber 102 reflects the beam of light, in the graded index multi-mode fiber 102, back through the graded index multi-mode fiber 102. In this first embodiment, the planar facet and applied mirror coating 103 are normal to the graded index multi-mode fiber 102 axis, and a radial displacement offset is generated to maximize the sensitivity across its range in one direction. A length, L, of the graded index multi-mode fiber 102 is selected to be an odd multiple of the quarter pitch length of the graded index multi-mode fiber 102, thereby refocusing the beam in the graded index multi-mode fiber 102 at the single-mode fiber 101 interface, after reflection from the mirror coating 103. The graded index multi-mode fiber 102 is deformed elastically during operation by angular, bending, or linear displacement between mechanical attachments 105 and 106. Significant elastic deformation of the graded index multi-mode fiber 102 is only possible along the radial direction, since as a mechanical rod, it is structurally much stiffer axially and azimuthally. The low numerical aperture of the focus causes its radial spot size to be much smaller than its axial spot size. Therefore, the radial offset of the returning focus of light, relative to the single-mode fiber core 111, is the dominant source for modulation of the intensity of light coupled back into the fundamental mode of single-mode fiber core 111. The light that is not coupled back into the single-mode fiber core 111 remains in the single-mode fiber 101 cladding and is either absorbed in the single-mode fiber 101 coating or detected separately. FIG. 2 illustrates position sensing with linear displacement of the mechanical attachment 106 along the vertical direction, shifting the position of the returning focus 107 relative to the single-mode fiber core 111, and thereby modulating the intensity of light coupled back into the single-mode fiber core 111. The bending shown in FIG. 2 is "S" bending in which two bends are created in the fiber by constraining the mirror coated facet to only translate and not rotate. The detection is also effective with "J" shaped bending allowing the free end to rotate and translate.

The low numerical aperture of standard single mode fiber creates a Gaussian mode for the single-mode fiber core 111 and a Gaussian intensity profile for the returning focus 107. Thus, the intensity response measured with displacement is a Gaussian function due to the overlap integral of the mode and reflected fields. The optical power (P) coupled back into the single-mode fiber core 111 has a Gaussian response to radial displacement (r) in accordance with the following formula, where $P_0$ is the total power of the returning focus, incident on the single-mode fiber 101:

$$P_{(r)} = P_0 e^{-2\frac{r^2}{r_0^2}}$$

Figure 3:
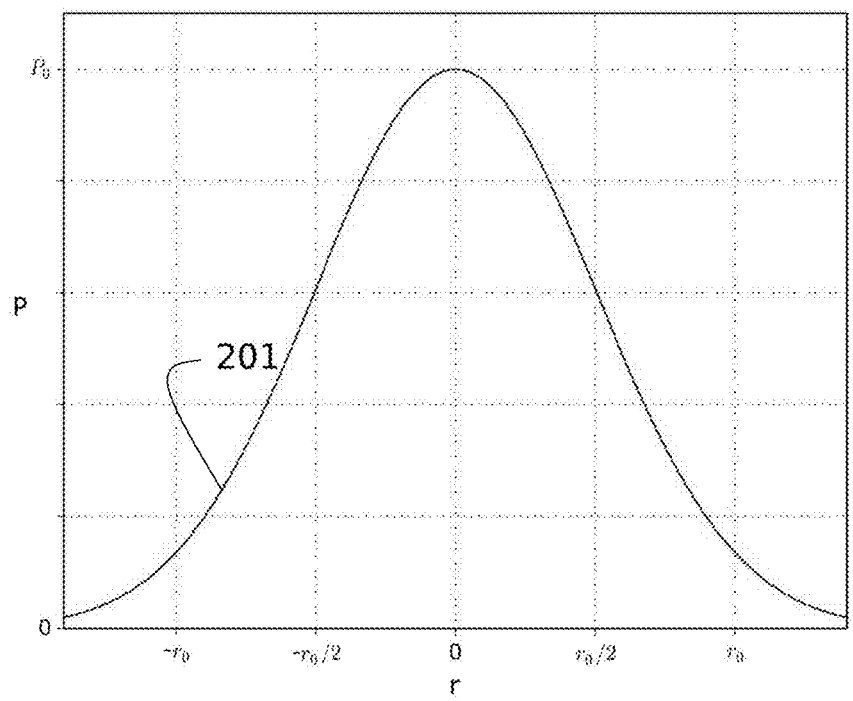
FIG. 3 is a graph of the Gaussian function representing the optical power (P) ideally coupled back into the single-mode fiber core for the first embodiment.

The optical power (P) is represented by curve 201 in FIG. 3. The radial displacement, where the power decreases by a factor of the mathematical constant $e^2$, is $r_0$, which is a result of the single-mode fiber 101 and graded index multi-mode fiber 102 characteristics and the locations of mechanical attachments 105 and 106. The change in power per unit of radial displacement (dP/dr) is obtained by taking the derivative of the Gaussian function above, which results in the following first order Hermite-Gaussian function:

$$\frac{dP_{(r)}}{dr} = \frac{-4P_0 r}{r_0^2} e^{-2\frac{r^2}{r_0^2}}$$

Figure 4:
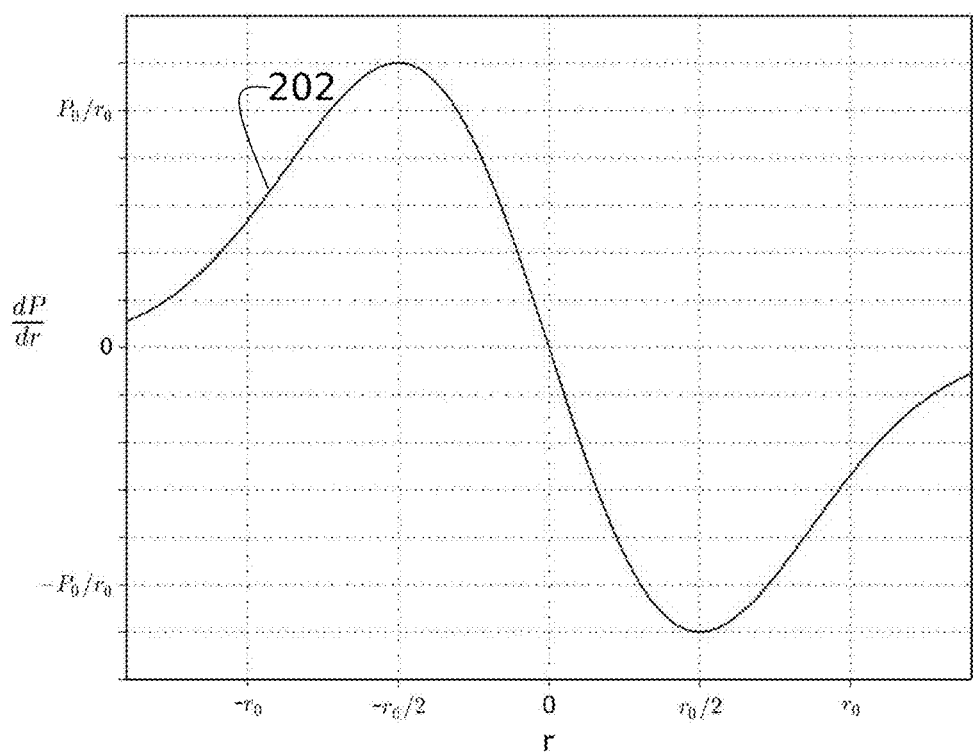
FIG. 4 is a graph of the derivative of the Gaussian function of FIG. 3 showing change in power power per unit of radial displacement (dP/dr)

The change in power per unit of radial displacement in the formula above, is represented by curve 202 in FIG. 4. Increasing the radial displacement up to $r_0/2$, decreases the optical power, but maximizes the sensitivity to small changes in radial displacement. Increasing the radial displacement above $r_0/2$ decreases both the optical power and the sensitivity. Operating slightly above or below $r_0/2$ has little effect on the sensitivity, but significantly alters the background and therefore the signal to noise ratio in some optical detection schemes.

Figure 5:
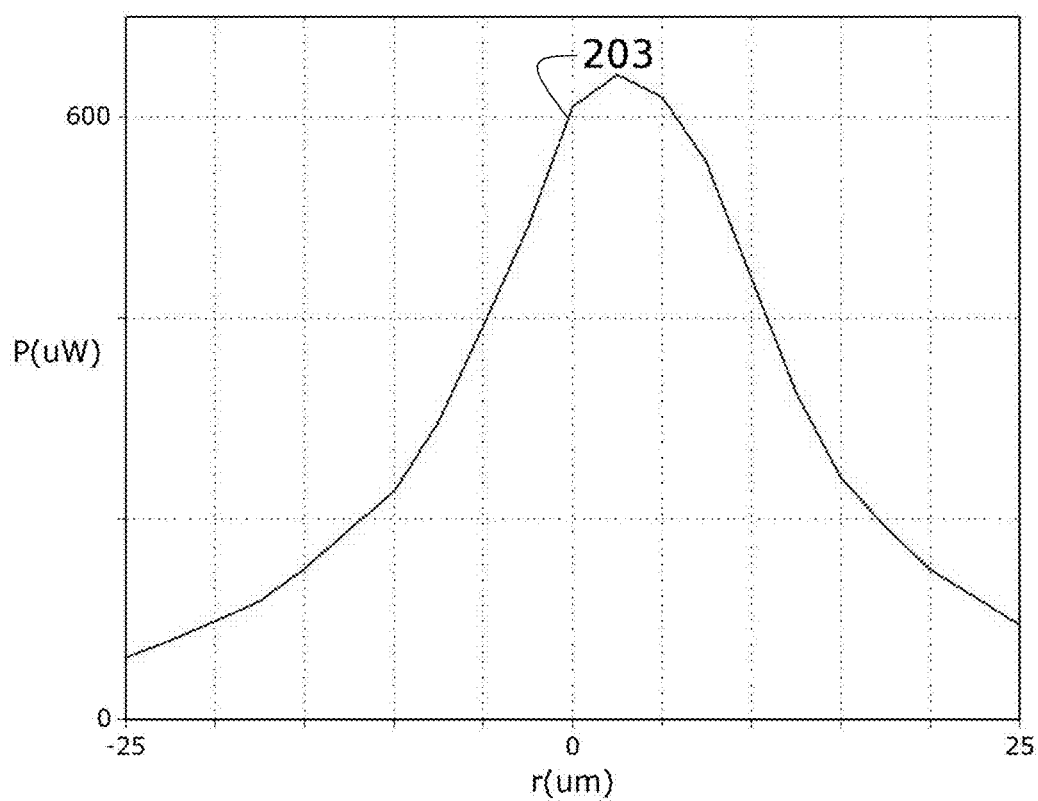
FIG. 5 is a graph of the Gaussian function representing the optical power (P) coupled back into the single-mode fiber core in our first reduction to practice.

The first embodiment has been reduced to practice using two standard, 125 um diameter, telecommunication fibers and a standard metal mirror coating. The single-mode fiber 101 had a 150 mm length and the graded index multi-mode fiber 102 had a 2.65 mm length, representing a three quarter pitch length. The reflective coating 103 was composed of 100 nm thick evaporated Aluminum, and the separate optical instrument 104 operated at a wavelength of 1.3 um. Mechanical attachments 105 and 106 to the graded index multi-mode fiber 102 were made with two component epoxy at 2 mm from an end 109 of the graded index multi-mode fiber 102, and at the end, respectively. The measured optical power with radial displacement for this reduction to practice, is shown by curve 203 in FIG. 5, and conforms well to our theoretical modeling of the optical system. The 2 mm free length of this position sensor yielded a practical range of 10 um, around an initial displacement of 10 um, with optimal sensitivity.

Figure 6:
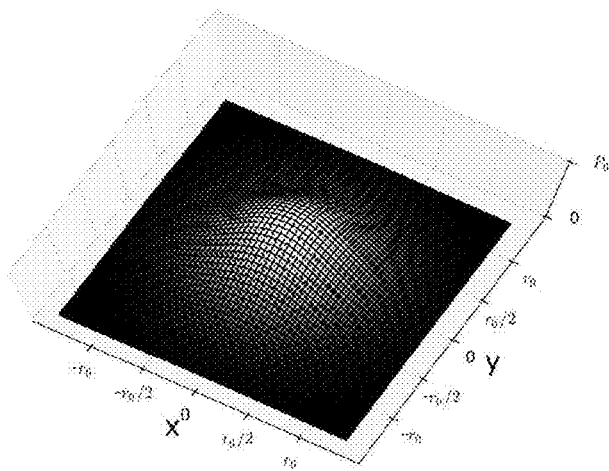
FIG. 6 is a 3-dimensional graph of the Gaussian function representing the optical power (P), as a function of Cartesian coordinate displacements (x,y)
Figure 7:
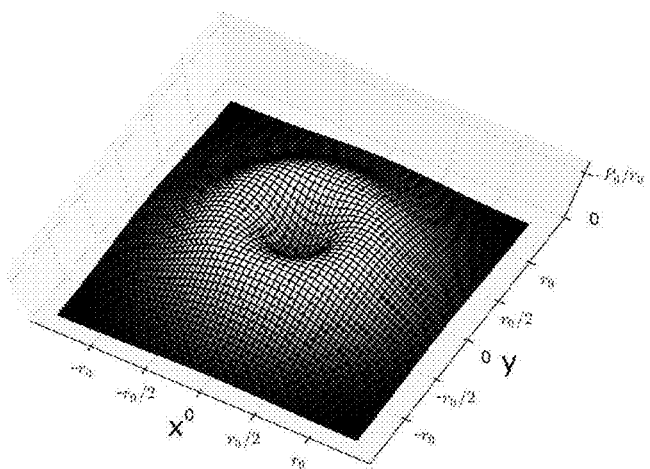
FIG. 7 is a 3-dimensional graph of the derivative of the Gaussian function of FIG. 6 representing the optical power per unit radial displacement (dP/dr), as a function of Cartesian coordinate displacements (x,y)

The radial displacement above can be generated at any azimuthal angle. However, in practical applications sensitivity only to a single Cartesian coordinate direction is usually desirable. FIG. 6 shows the optical power (P) and FIG. 7 shows change in optical power per unit radial displacement (dP/dr), as a function of displacements (x,y). Due to a lack of azimuthal sensitivity, the radial and azimuthal offsets should be selected to project the radial unit vector, along the direction of desired sensitivity, and the azimuthal unit vector, along the direction of sensitivity suppression. For example, by placing a initial displacement of $r_0/2$ only along the x-axis, the sensitivity to small displacements along the x-axis, is maximized, while the sensitivity to small displacements along the y-axis, is minimized.

Figure 8:
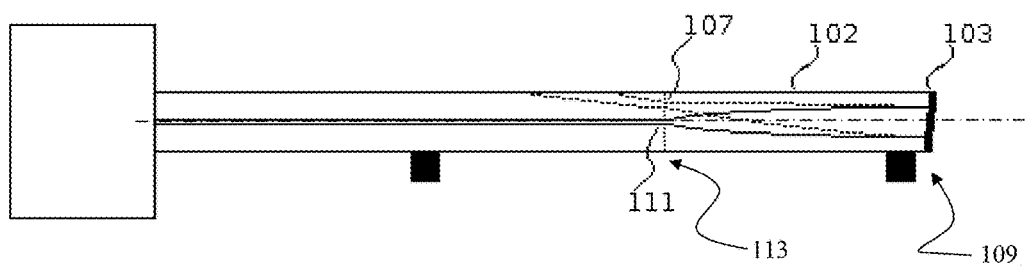
FIG. 8 is a side view representation of a second embodiment of the Fiber Optic Displacement Sensor.

For a second embodiment of the fiber optic displacement sensor described herein, the displacement sensor is identical to that of the first embodiment, except that the planar facet and applied mirror coating 103 is angled relative to an axis of the graded index multi-mode fiber 102, and offset is generated by this angle without any initial displacement offset, as shown in FIG. 8. Prior to applying the mirror coating 103, the facet may be generated by angle cleaving or polishing.

The second embodiment employs an offset of $r_0/2$, with the planar facet angled towards the x unit vector, however other values and directions may be used to increase the sensitivity, depending on the desired sensor application. The intensity response with displacement is an offset Gaussian function, due to the overlap integral of the mode and reflected fields, associated with the angled planar facet. The optical power (P) coupled back into the single-mode fiber core 111 has an offset, Gaussian response to displacement, along the Cartesian coordinate (x), in accordance with the following formula, where $P_0$ is the total power of the returning focus, incident on the single-mode fiber 101:

$$P_{(x)} = P_0 e^{-2\frac{(x-\frac{r_0}{2})^2}{r_0^2}}$$

Figure 9:
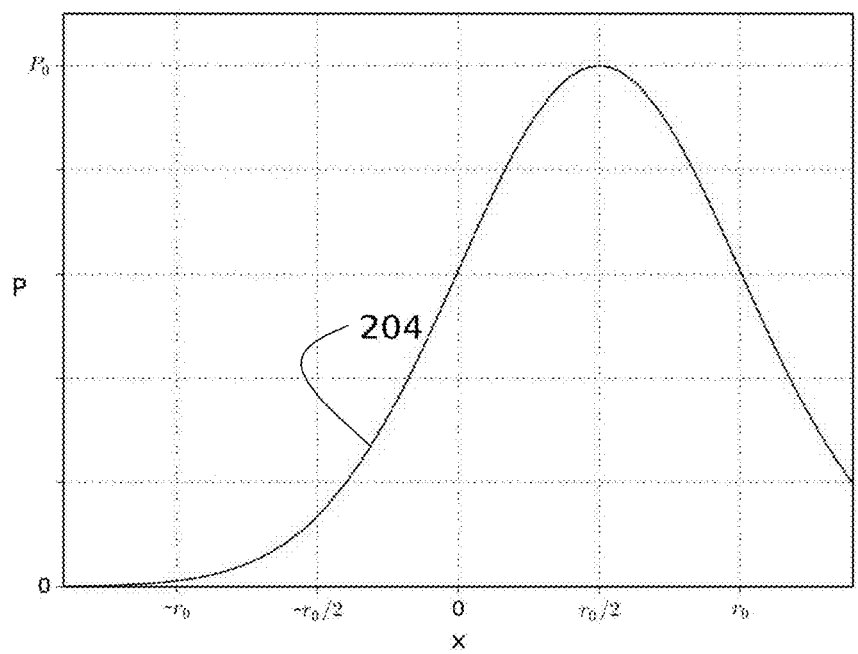
FIG. 9 is a graph of the Gaussian function representing the optical power (P) ideally coupled back into the single-mode fiber core for the second embodiment.

The optical power (P) is represented by curve 204 in FIG. 9. The change in power per unit of x displacement (dP/dx) is obtained by taking the derivative of the Gaussian function above, assuming the y displacement value is equal to zero, so that r equals x, which results in the following, offset, first order, Hermite-Gaussian function:

$$\frac{dP_{(x)}}{dx} = -4P_0 \frac{\left(x-\frac{r_0}{2}\right)}{r_0^2} e^{-2\frac{(x-\frac{r_0}{2})^2}{r_0^2}}$$

Figure 10:
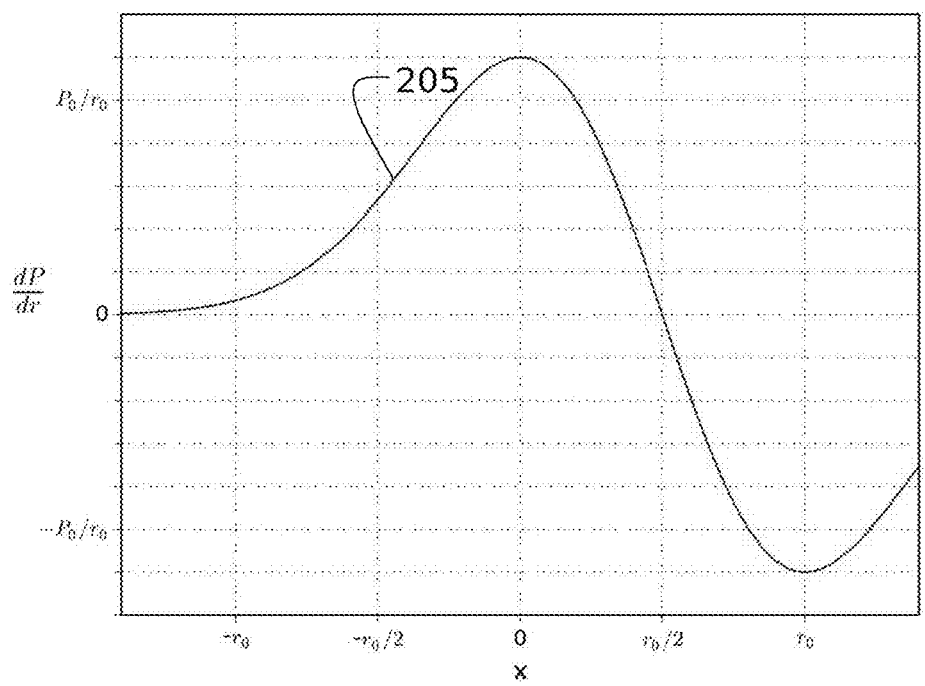
FIG. 10 is a graph of the derivative of the Gaussian function of FIG. 9 showing change in power power per unit of x displacement (dP/dx)

The change in power per unit of displacement in the formula above, is represented by curve 205 in FIG. 10. With an angular offset, instead of an initial displacement offset, the sensitivity to small changes in x displacement is maximized, while the sensitivity to small changes in y displacement is minimized.

Figure 11:
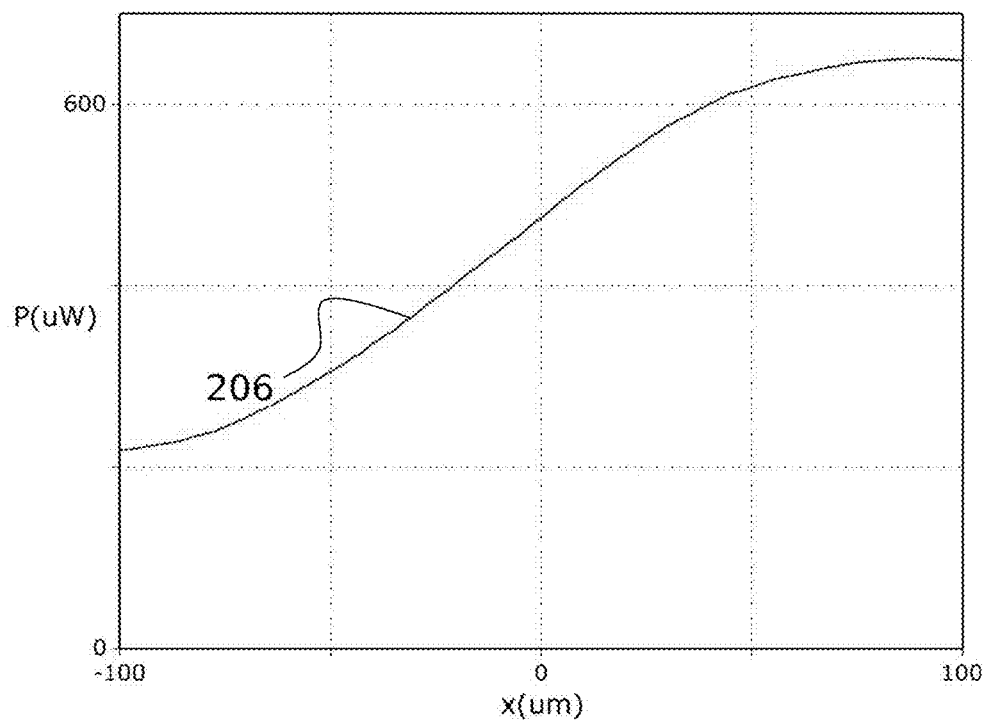
FIG. 11 is a graph of the Gaussian function representing the optical power (P) coupled back into the single-mode fiber core in our second reduction to practice.
Figure 12:
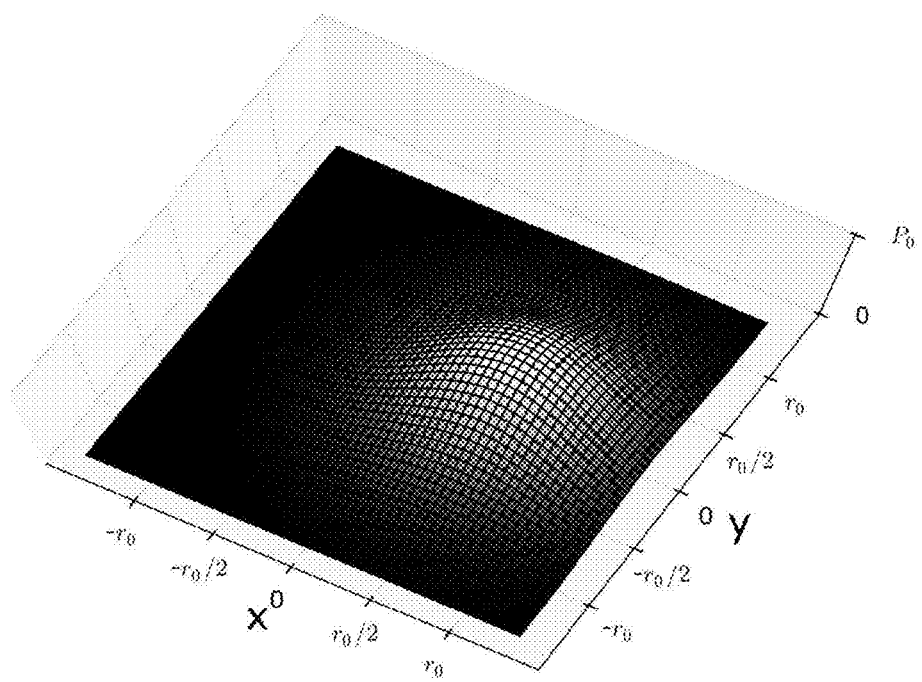
FIG. 12 is a 3-dimensional graph of the Gaussian function representing the optical power (P), as a function of Cartesian coordinate displacements (x,y)

The second embodiment has been reduced to practice, and is identical to the first embodiment, except that an offset angle was introduced and mechanical attachments 105 and 106 were made with two component epoxy at 3 mm from an end 113, on the single-mode fiber 101, and at the end 109 of the graded index multi-mode fiber 102, respectively. In this case, mechanical attachment 105 on the single-mode fiber 101 still deforms the graded index multi-mode fiber 102, but the greater free length results in greater sensor range. The measured optical power with x displacement for this second reduction to practice, is shown by curve 206 in FIG. 11. The 3 mm free length of this position sensor yielded a practical range of 100 um, without any initial displacement offset, and maintained optimal sensitivity. FIG. 12 shows the theoretical optical power (P), as a function of displacements (x,y), for reference. In this second embodiment, the sensitivity to small displacements along the x-axis is maximized, while the sensitivity to small displacements along the y-axis is minimized.

Figure 13:
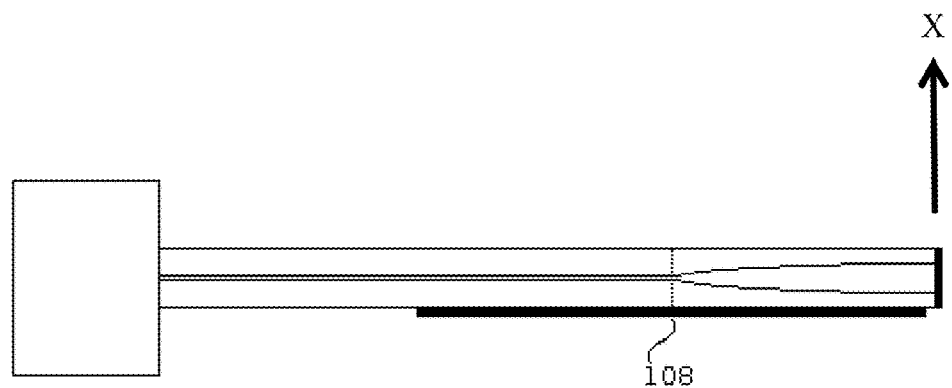
FIG. 13 is a side view representation of a third embodiment of the Fiber Optic Displacement Sensor.

For a third embodiment of the fiber optic displacement sensor described herein, the displacement sensor is identical to that of the first embodiment, except that mechanical attachments to a bending object 108 are continuous instead of discrete, as shown in FIG. 13. When attached to an object, the deformation of the object leads to deformation of the multi-mode fiber 102, in order to measure the bending of the object.

In all embodiments, the reflective mirror coating 103 may be of the metal or dielectric type. The selection of the mirror coating is done according to the light source in the optical instrument 104. Coupling between the single-mode fiber 101 and separate optical instrument 104 may generated by a fiber connector, a fusion splice, or free space. The stress and forces involved in deforming the graded index fiber may be near the elastic limits of the silica, and thus the strength of the mechanical attachments can prove challenging, because of their yield strengths. For this reason, in practice, capillary tubing is used to serve as a mechanical buffer, thus decreasing the forces exerted on the bonding agents, such as the two component epoxy. The mechanical attachments may be rotationally fixed or pivoting.

What is claimed is:

1. A displacement sensor comprising:
   a graded index multi-mode fiber with a length that is an odd multiple of a quarter pitch length of the graded index multi-mode fiber;
   a single-mode optical fiber fusion spliced to the first end of said graded index multi-mode fiber;
   a reflective mirror coating applied to a planar facet on the second end of said graded index multi-mode fiber; and
   a plurality of mechanical attachments along the graded index multi-mode fiber and single-mode optical fiber that mechanically elastically deform said graded index multi-mode fiber with at least one bend when any one of said plurality of mechanical attachments is displaced relative to any other one of said plurality of mechanical attachments.

2. The apparatus of claim 1, in which the said planar facet is normal to an axis of said graded index multi-mode fiber and an offset of the planar facet is generated by an initial displacement of one of said plurality of mechanical attachments.

3. The apparatus of claim 1 in which a normal to said planar facet is oriented at an angle relative to an axis of said graded index multi-mode fiber, and said angle induces enhanced sensitivity.

4. The apparatus of claim 1 in which the said reflective coating is a metal or dielectric coating.

\* \* \* \* \*